Sept. 30, 1941. H. M. SUTTON ET AL 2,257,624
PROCESS AND APPARATUS FOR PNEUMATIC SEPARATION OF MASSES COMPOSED
OF PARTICLES HAVING VARIED CHARACTERISTICS
Filed May 18, 1939 4 Sheets-Sheet 1

INVENTORS
Henry M. Sutton and
Frank E. Wood
By Pattison Wright & Pattison
ATTORNEYS Sept. 30, 1941.  H. M. SUTTON ET AL  2,257,624
PROCESS AND APPARATUS FOR PNEUMATIC SEPARATION OF MASSES COMPOSED
OF PARTICLES HAVING VARIED CHARACTERISTICS
Filed May 18, 1939  4 Sheets-Sheet 4

Henry M. Sutton
Frank E. Wood
INVENTORS

Patented Sept. 30, 1941

2,257,624

UNITED STATES PATENT OFFICE 2,257,624

PROCESS AND APPARATUS FOR PNEUMATIC SEPARATION OF MASSES COMPOSED OF PARTICLES HAVING VARIED CHARACTERISTICS

Henry M. Sutton and Frank E. Wood, Dallas, Tex., assignors, by mesne assignments, to Reconstruction Finance Corporation, Dallas, Tex., a corporation of the United States Application May 18, 1939, Serial No. 274,460

7 Claims. (Cl. 209—4)

This invention relates to improvements in process and apparatus for pneumatic separation of masses composed of particles having varied characteristics, and the improvements have in view the several novel features hereinafter defined, described and claimed.

One object of these improvements consists in providing a new type of deck surface having certain novel characteristics and novel operations.

Another object is to combine with the new type of separator deck a humidifier which acts upon the particles as they are being fed to the separator surface to be separated.

A further object consists in carrying out a new process by which the particles composing a mass are separated.

Another improvement is to provide an apparatus comprising the above novel features for carrying out the above objects.

Additional objects will appear from the following description.

In the drawings:

Fig. 7 is a longitudinal horizontal sectional view of the humidifier feed trough looking toward the separator table.

Figure 1:
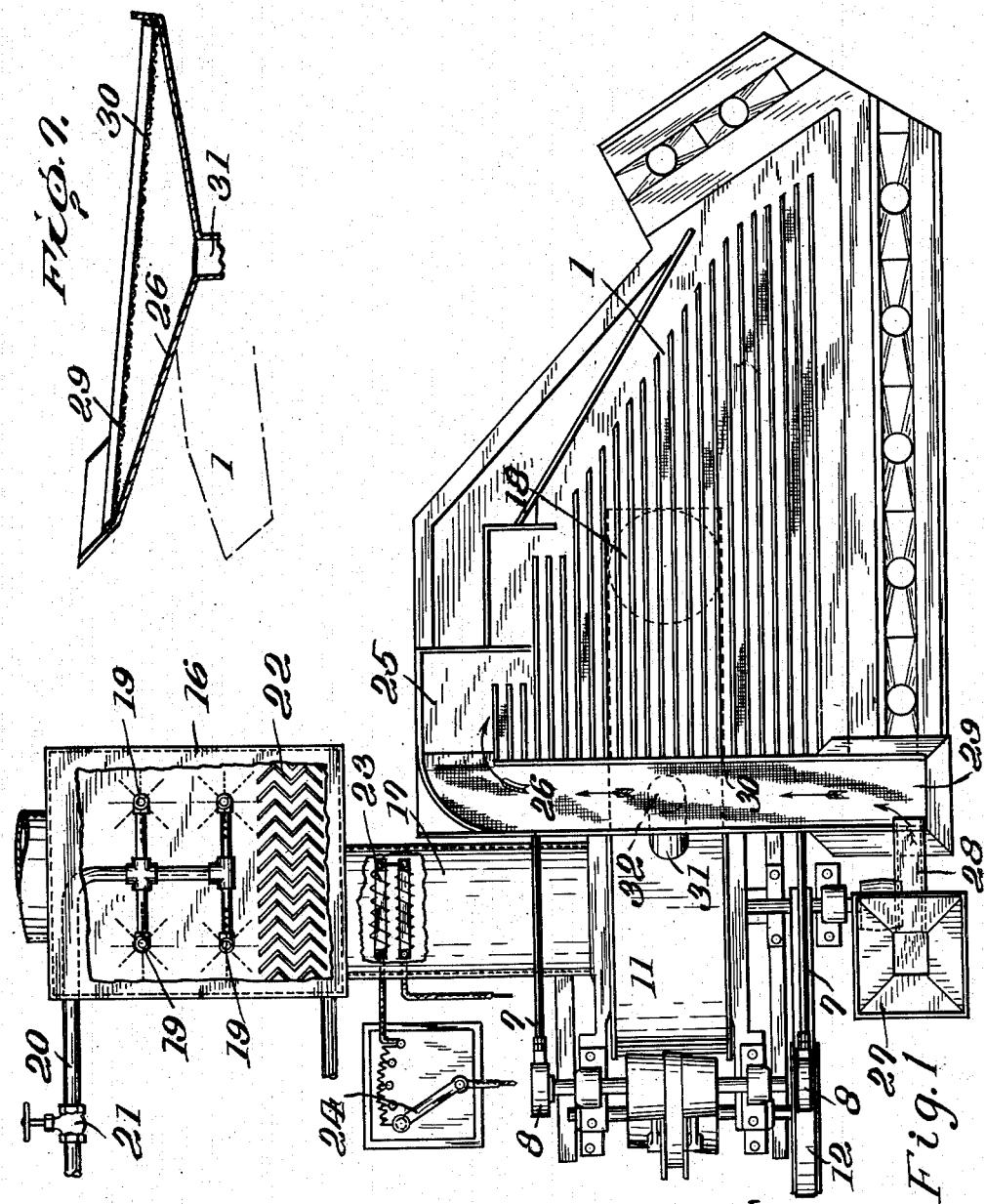
Fig. 1 is a top plan view of an apparatus which embodies the improvements here sought to be protected.
Figure 2:
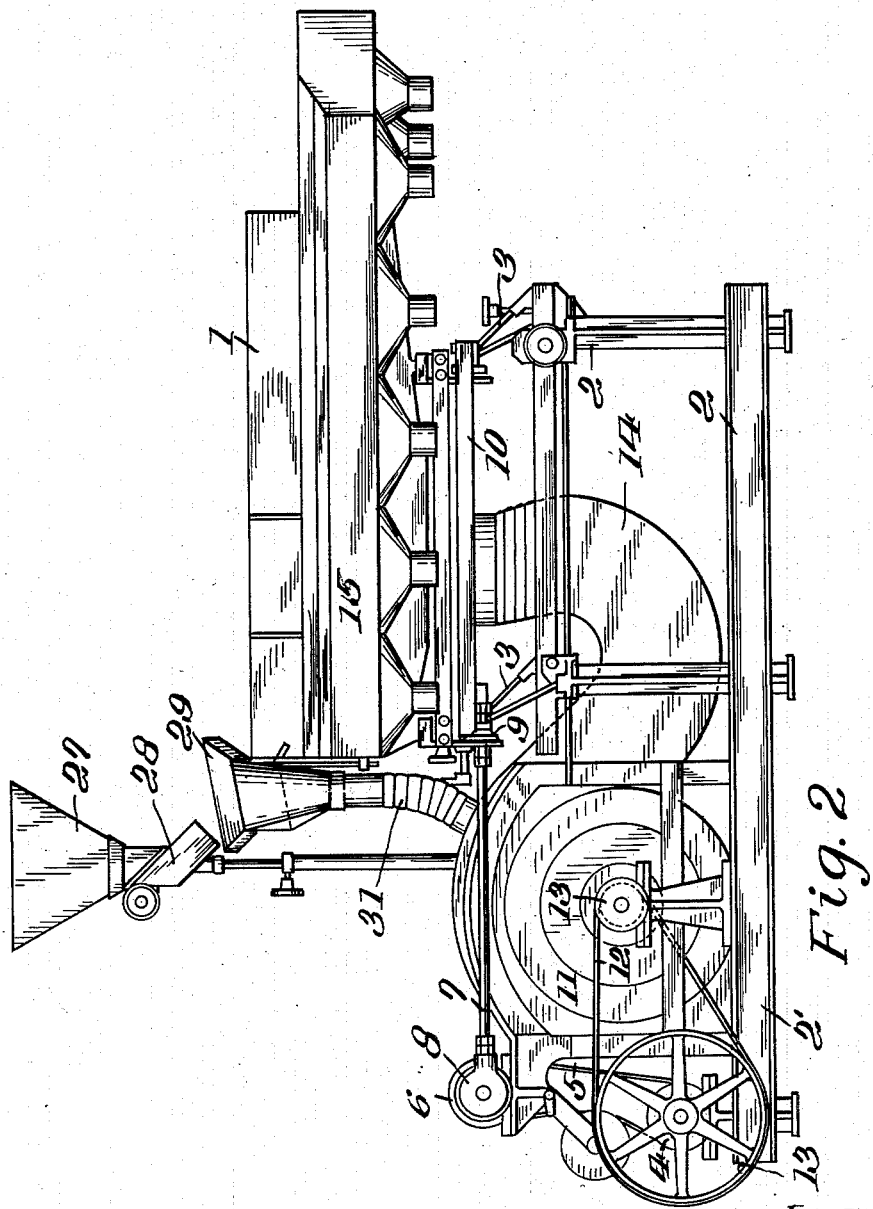
Fig. 2 is a side elevation of Fig. 1.

Speaking generally the type of separator here shown is well known to those skilled in this art. It involves the well known type of deck 1 which is supported on a suitable framework 2 by means of toggles 3 whereby the deck can be suitably operated as by a type of motor which will now be referred to. This motor is supported on an extension 2' of the supporting frame 2 and it involves a pulley wheel 4 around which a suitable belt 5 passes to a belt pulley 6 which by means of a rod or rods 7 which have their ends 8 carrying eccentrics and their ends 9 connected with the table support 10 reciprocates said table back and forth. Also the said motor is operatively connected with a suitable fan in a housing 11 by means of a belt 12 and a suitable pulley 13 by means of which the fan is rotated and this fan supplies air through the housing and a suitable passageway 14 to the air chest 15. The air, as is well known, is supplied to the housing under the deck 1 and through a porous deck and the deck cover is one of the features sought to be covered by this application. The operation of the elements which have been described are so well understood by those skilled in this art that a description of the operation of these parts are unnecessary.

The present improvements relate to two features, one, the deck covering or surface—specifically referred to hereafter—and a humidifier which acts on the particles to be separated as they are fed to the separator, as will be described hereinafter. In the first place we will refer to the humidifier in Fig. 1 which consists of a suitable chamber 16 and connected with this chamber is a suitable pipe 17 through which the air that is fed to the fan housing 11 passes, and from the fan 11 air passes to the said air chest 15 through an opening 18 shown in dotted lines, Fig. 1.

Referring now particularly to the humidifier which consists in providing the chamber 16 with a suitable number of nozzles 19 to which water passes through a suitable pipe 20 from any desired source and this water is controlled by a valve 21. In dotted lines, Fig. 1, the spray is indicated and also in the same housing 16 with these spray devices and between them and the pipe 17 is located suitable condenser plates 22. Also in the pipe 17 between this chamber 16 and the fan housing 11 suitable electric coils or heaters 23 are placed and these coils are controlled by a switch handle 24 for regulating the amount of current fed to these coils. These coils become heated and they act to heat the humidified air and it flows through the tube 17, and the heat of these coils is controlled by the amount of current flowing to them and in turn the amount of current is controlled by the switch lever 24.

In connection with this humidifier and located in rear of the feed end 25 of the separator 1 is a trough 26. The particles to be separated are fed to the end of this trough opposite the feed end of the separator from a suitable hopper 27. It will be readily understood that the mass of particles that is to be separated flows from this hopper through a pipe 28 into the end 29 of the said trough 26. This trough 26 declines from its end 29 to the feed end 25 and the table is reciprocated by the mechanism before described and consequently the particles to be separated flow down the declined trough to the feed end 25 of the separator. The bottom of this trough 26 is porous as shown in broken lines 30, Fig. 1, and in full lines Fig. 7 and connected with the bottom of this trough below the porous bottom is a pipe 31 which has its lower end connected with the fan housing and its upper end 32 connected below the porous bottom of the feed trough 26.

Figure 3:
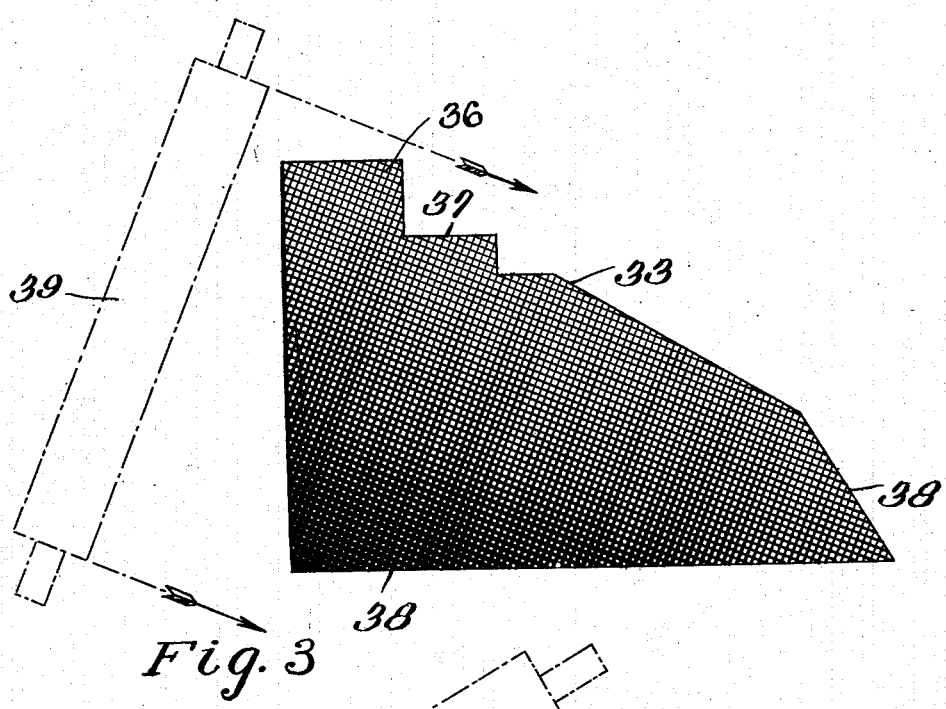
Fig. 3 is a top plan view of the improved separator deck showing in connection with it the rolls by which the improvement is carried out.
Figure 4:
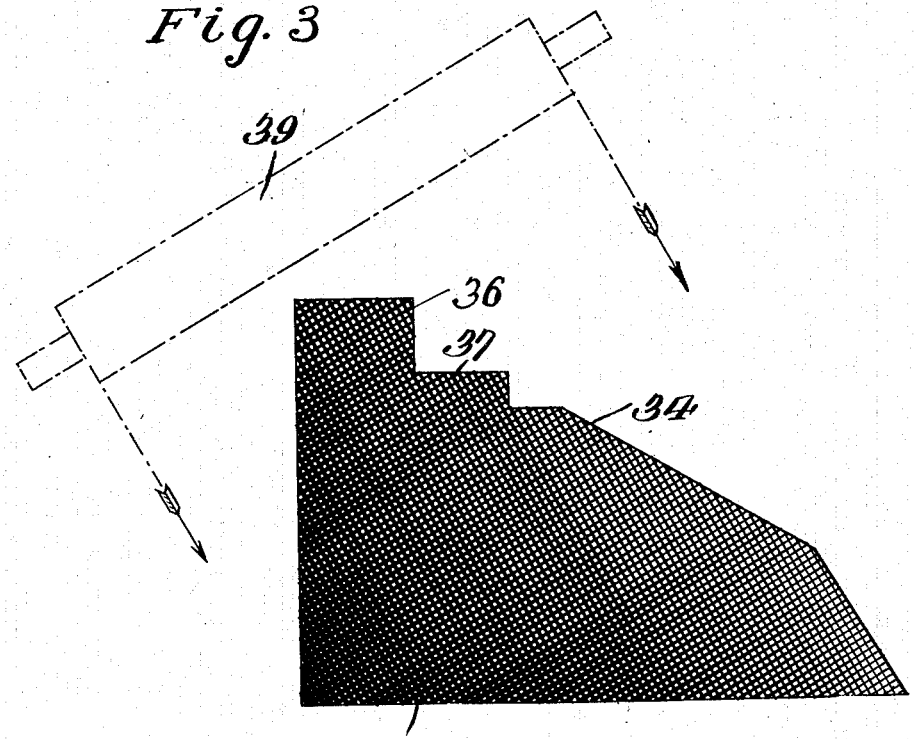
Fig. 4 is a view similar to Fig. 3 but the latter figure shows a porous deck having certain of its orifices closed and rollers shown in connection with the deck.

Referring now to the deck cover or surfaces 33 and 34 shown in Figs. 3 and 4, attention is particularly called to these particularly constructed deck covers. Attention is first directed to Fig. 7 which shows specifically a small part of the said deck surfaces. It will be seen from Fig. 7 that these deck surfaces or covers are preferably formed of a very fine wire construction, that is, a fine wire screen 33 and 34 made up so that the wires cross each other. In making this improved form of deck cover the metal of which the screen is made is depressed so that it is flattened out and caused partially to close the spaces 36. These flattened or depressed portions increase when considered from the feed side 37 to its delivery side or portion 38. From this it will be observed that the deck surfaces are thus formed with graduated passageways or orifices. It will also be noted that these surfaces have each orifice smaller or larger than the orifice at its side according to whether you consider this from the feed end or the delivery end or side 38 of the deck. Accordingly this improved deck surface or cover consists of one which has its orifices graduated in size so that when taking the deck surface as a whole no one part of it is compressed or flattened exactly the same amount as any other part of the deck.

According to the teaching of the prior art so far as a deck surface or cover is concerned, applicants are the first to ever disclose a deck in which no part of it is exactly the same as any other part of it.

It is well known to those skilled in this art that in the operation of pneumatic separators it is necessary that more air be supplied at or near the feed portion of the deck because at this portion the bed is thicker and heavier and therefore more air is required to lift the particles in order to segregate them one from another due to their difference in specific gravity. Attempts have been made by applicant, Henry M. Sutton, and W. L. and E. G. Steele, as shown in their Patent No. 898,020 dated Sept. 8, 1908, wherein it is shown that this patent in a very broad sense only accomplishes the above result by using as shown in Fig. 17 one porous layer for a distance, two porous layers for another distance, three porous layers for another distance and four porous layers for the balance of the distance. This permitted in a broad sense more feed or air at the feed end of the deck as shown in the above and less air at various points on down to the delivery end of the deck. It must be noted however that in this it shows that the air in not graduated except in step by step. In this patent it required three steps, and the whole deck was transversely divided into four parts as clearly shown in Fig. 16 of the said patent. This step by step patented type have been commercially used for years. Variations of this have been used by other patentees but in all cases the above result has been accomplished by the step by step construction and not by what is termed in this case for want of a better description, a graduated porosity or regulation of the sizes of the orifices in said deck cover. This makes what may be referred to as practically an invisible variation in the amount of air fed through this deck cover. It is this variation of the size of the orifices that the term "graduated" is used in this case. Some have used adjustable baffles under the deck but that only carries out the step by step control of the air. This step by step control of the air has been accepted as satisfactory by the coal trade. The present invention is particularly used in delicate separating operations and the above patented step by step constructions would admit a volume of air through them too great to be applied to many of these delicate separations which are often called for by those working in this delicate separation line. Applicants have found by so restricting the air openings or orifices at desired points of the deck cover as above described, the air that is being applied to separate the material upon the deck surface of these delicate separating operations is obtained. This has not previously been accomplished.

The patented constructions above referred to which embody the step by step processes will not accomplish the delicate operations. Under these delicate operations such material in the use of the above patents would pass over zones in which the air pressure is varied due to the step by step operation, and the particles of it would not be separated as is the case with the present invention. This step by step operation or action which has been used by the art since 1908—for fully 30 years would defeat what we accomplish in the present arrangement or construction of our deck surface or cover. It would not be possible to separate these finely divided materials calling for delicate operations with deck covers composed of either finely punched metal sheets or even the finest screen wire mesh ordinarily manufactured for sifting purposes. With our improved deck cover we are able to build a sufficient static air pressure within the air chest to sustain the material being separated at the orifices in the deck cover and to obtain the separation of the particles. The action of this improved deck surface or cover is to create under the mass of material what we here refer to as a continuous air surface regulation without any step by step operation. It makes what may be termed a continuous graduated air surface with no intervening spaces which are marked in the step by step operation heretofore used.

This new type of deck cover herein disclosed is exceedingly useful in the milling of certain products in the separations that are required in the process in which it is quite essential that there be no step by step operation.

Figure 5:
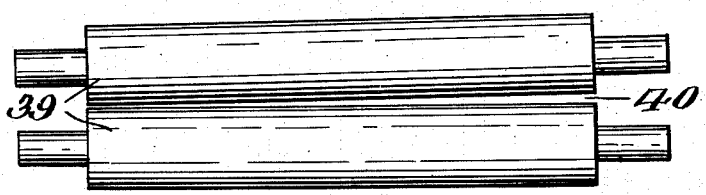
Fig. 5 is a side elevation of the rollers utilized in producing the decks shown in Figs. 3 and 4.
Figure 6:
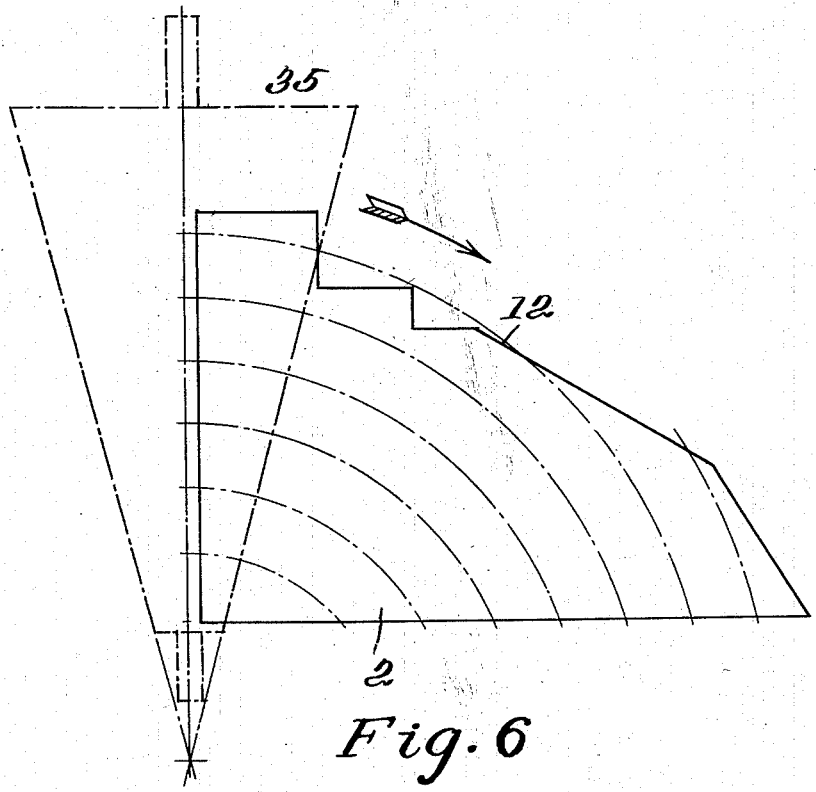
Fig. 6 shows a deck and indicates in dotted lines a pair of conical shaped rollers pivoted at one end and an arrow indicating the direction of movement of the said rollers for forming deck surface.

In Figs. 3, 4, 5 and 6 we show the method used by us for producing this improved deck surface. As shown in Fig. 3 this cover is composed of a fine wire netting and it is subjected to the action of rollers 39 which pass over this deck at the angle indicated clearly in the said figures. In Fig. 5 the rollers 39 are separately disclosed and in this figure it shows that they are set at a slight angle to each other to form at one end the space 40. The deck cover or surface shown in Fig. 3 is passed between the rolls and it flattens out and partially closes up the normal spaces between the fine wires at the delivery side 38 and this closing or flattening method is reduced towards the feed end 38, so that at the feed end there is increased air space to supply sufficient air where the thickest bed lies and this is gradually flattened more and more thus decreasing until it finally reaches the delivery side 38 of the deck. We preferably use a type of wire cloth because it gives us the advantage of obtaining suitable static air pressure within the air chest and it has the advantage of enabling us to apply our tables to the separation of many compounds in the industrial arts that are of an oily nature that will soon fill up the openings of a textile deck and render it useless. By reason of the fact that there is no nap on wire cloth this blinding action or result is greatly postponed, and when it does occur the deck can be washed or otherwise cleaned without detriment to the metal cloth.

Humidifier

The operation of the humidifier has been previously referred to. Some of the particles to be acted on are either too dry or too wet for best separation, and the object of the humidifier is to make those particles which are too dry wetter, and those which are too wet drier and in that way we place the particles in such condition as to make them more readily separable. Some of the particles of these masses are so constituted that they absorb liquid more readily than other particles and by providing this humidifier the air being fed to the chest under the deck and through the deck cover to the material above should be of a given degree of humidity to accomplish better separation. In order to assure the proper humidity of the air the chamber 16 is provided in which all the air which is fed to the machine as well as to the feed trough 26 is sprayed and therefore all of the air is subjected to the same spray, and if there is a surplus in the humidifier the surplus is taken out by the condenser plates 22. The air then passes through the pipe 17 where all of the air that is humidified is fed to the air chest and to the particles feed trough 26. In this way certain particles which absorb the spray more readily are made heavier than the other particles and are therefore of greater specific gravity. When these particles therefore reach the deck the separation is made between them due to the difference of specific gravity of the respective particles.

Referring further to the humidifier, the air used in the separation process is drawn as previously stated by the table fan through any well known form of filter, composed of stockings of closely woven textile material, not shown, for the purpose of assuring pure air being delivered to the air chest under the table and to the feed trough 26. This is next passed as previously stated, through the humidifier and this humidifier in a general sense may be of any desirable make and supply a predetermined amount of moisture. This is delivered simultaneously to a primary particles feeding trough. It is of course understood that the air in this separation is not actually wet nor even perceptibly moist but still contains sufficient moisture to prevent drying out the products where it is necessary to keep the humidity of them at a given value. On the other hand where there are certain seed stocks that contain certain noxious weed seed, and where one is moisture absorbent and another is not, and where they are of the same specific gravity then the addition of moisture to one of these elements increases its specific gravity over the other and a separation can be effected that would be otherwise impossible. In this case considerable amount of moisture is added, but not enough to produce condensation either in the air chest or other parts of the separating apparatus. This is taken care of by the condenser in the humidifier. The temperature of the air governs of course largely the amount of moisture the air retains, and the heating unit will be added to the air intake as shown in the drawings.

The humidifier causes a denser medium than air at ordinary atmospheric temperature of, say 60 degrees, and therefore the moisture incorporated in the air naturally is more dense, and this medium in the separation process increases the sensitivity of the separation by producing a greater suspension action on the various particles under treatment. It follows that when substantially uniform size is obtained between the different particles, then the pneumatic separation method is more accurate, and it is found to cause a very much faster separation. In other words, the denser the medium employed for separation the less classification of the particles is required.

The humidifier of course is for use only where the table is placed in a flow sheet of milling operation and required to retain the humidity of the air therein in order to obtain proper separation and proper humidifying of the particles passing through the said humidifier and the trough. The object of the feeding trough or chute 26 is to deliver the humidified air preliminarily to the mass of particles which are to be separated before the separation begins.

Changes in the construction can be made without departing from the spirit of the present invention so long as said changes are within a liberal interpretation of the appended claims.

1. A porous metal deck surface for a pneumatic separator table having its deck composed of fine woven wire provided with orifices and the metal surrounding said surfaces flattened said flattened portions gradually and practically invisibly increasing substantially throughout said deck surface from its feed end to its delivery end as distinguished from the prior art step by step construction.

2. A pneumatic separator for the purpose described comprising a table having a porous separator deck constructed to allow air therethrough in graduated amounts as distinguished from the step by step separation of the prior art, combined with a feed trough having a porous bottom extending across the feed end only of said deck, and a humidifier feeding humidified air to said feed trough and through said porous bottom and under the material being fed through said trough to said separator deck.

3. A pneumatic separator having a table provided with a porous separator deck having the orifices thereof graduated in size as distinguished from the prior art step by step separation in combination with a feed trough extending across the feed end only of said deck in advance of said separator deck, means supplying air to said separator deck, a humidifier in advance of said separator deck through which said air passes, said humidifier feeding said air to and through the bottom of said feed trough below the particles passing through said trough.

4. A pneumatic separator comprising in combination, a porous separator deck, a feed trough for said deck, an air supply to the under side of said deck and a separate air communication with said trough, a humidifier in said air supply in advance of said deck and trough, and air heating means for said air supply between said humidifier and said deck and trough.

5. A separator for separating very small particles of a mass comprising a porous deck, the porosity of the deck graduated in a general direction from the feed end to the discharge end of the deck to allow air to pass through the deck in varying amounts as distinguished from the step by step separation of the prior art, combined with a humidifier feeding humidified air to said particles thereby making some particles heavier than others, for the purpose specified.

6. A pneumatic separator for separating a mass of very small particles which have different absorbing characteristics comprising a porous deck having adjacent pores of graduated variation in size in a general direction from the feed end toward the discharge end of the deck, a fan feeding air under said deck, and a humidifier operatively connected with said fan, whereby said particles absorb more or less moisture from said air which assists in the separation of the particles.

7. A pneumatic process for the separation of particles of a mass having moisture absorbing properties in various degrees which consists in subjecting said mass to a humidifying process which causes certain particles to retain a moisture and therefore to become heavier than other particles and afterwards subjecting said mass to a continuous separating process which consists in subjecting said mass to the action of air currents exerting a lifting force gradually decreasing from the feed end to the delivery end of a supporting surface on which the particles are separated by the action of gradually decreasing air currents.

HENRY M. SUTTON.
FRANK E. WOOD.